W. W. TOMPKINS.
TIRE ARMOR.
APPLICATION FILED MAR. 27, 1909.
954,362.
Patented Apr. 5, 1910.
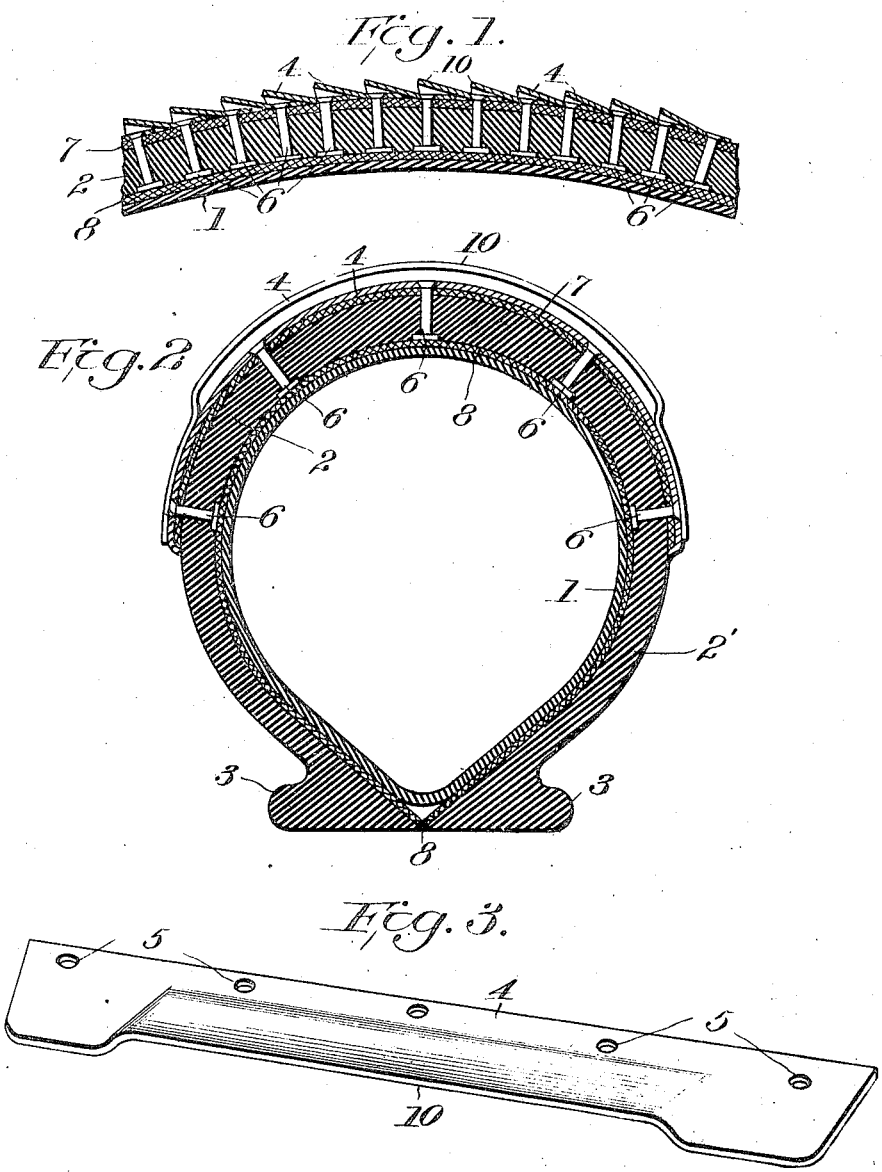

UNITED STATES PATENT OFFICE.

WALLACE W. TOMPKINS, OF NEWBURGH, NEW YORK.

TIRE-ARMOR.

954,362.

Specification of Letters Patent.

Patented Apr. 5, 1910.

Application filed March 27, 1909. Serial No. 486,200.

*To all whom it may concern:*

Be it known that I, WALLACE W. TOMPKINS, a citizen of the United States, residing at Newburgh, in the county of Orange and State of New York, have invented certain new and useful Improvements in Tire-Armor, of which the following is a specification.

My invention relates to pneumatic tires, and more particularly to an external armor adapted to be secured to such tires.

It has heretofore been proposed to attach to the outside of pneumatic tires a metallic covering or armor to protect them from injury, such armor comprising thin, overlapping scales or plates, which may be temporarily attached to the tire after it is in position on the wheel. Trouble has been experienced, however, owing to the fact that such detachable armor is liable to become disengaged from the wheel under service conditions, and thus cause great inconvenience.

It is one object of the present invention therefore, to provide a flexible, puncture-proof armor which can be permanently attached to the tire at the time of its manufacture.

A further object is to provide an armor of this character so arranged that it will not materially detract from the resiliency or "life" of the tire.

A still further object of the invention is to provide improved means for preventing the armor plates and their securing means from injuring or wearing the tire.

With the above objects in view, my invention consists in the construction and arrangement of parts hereinafter described, and illustrated in the accompanying drawing, in which, Figure 1 is a longitudinal section through a fragment of the tire equipped with my improved armor; Fig. 2 is a transverse section through the tire complete; Fig. 3 is a perspective view showing one of the scales.

In the drawings, my invention is illustrated as applied to a double tube tire of the well-known "clencher" type. 1 designates the inner tube, and 2 the outer tube, which is provided with the usual ribs 3, for attachment to the rim (not shown).

My improved armor comprises a series of thin, flat, resilient, overlapping, metal plates or scales 4. As clearly shown in Fig. 3, the scales may be of a somewhat trapezoidal shape, having rounded corners, and provided along their base with a series of rivet holes 5. Rivets 6 pass through these holes and through the outer tube 2, as clearly shown in Figs. 1 and 2. Referring again to Fig. 1, it will be noted that the scales overlap about one-half their width, and that the rivet heads of one scale are covered by the next.

Referring to Fig. 2, it will be observed that the scales 4 extend only about half way around the tire, and thus leave a portion of the tire 2', adjacent the rim, which is not covered by a metallic armor, and which therefore, preserves its normal resiliency. Moreover the plates or scales 4 are preferably formed of spring steel and are, therefore, themselves resilient.

In order to prevent wear of the outer tube, I interpose between such tube and the plates 4, a strip 7 of canvas, or other wear resisting material. The rivets pass through this canvas and the rubber tube 2, and terminate on the inside of such outer tube.

In order to protect the inner tube from the wear which might be occasioned by the ends of the rivets 6 bearing thereagainst, I interpose the tube 8 of canvas, or similar material, between the inner and outer tubes of the tire, and this canvas prevents the rivet heads from coming into contact with the inner tube.

In order to prevent slipping or skidding of the tire each of the plates or scales 4 has the middle portion of its front edge struck or flared-up as shown in Fig. 3, so as to provide a sharp projecting ridge 10, for engagement with the surface over which the tire is traveling.

It will thus be seen that I have provided a simple, wear resisting tire which is cheap to manufacture and not liable to get out of order, and it is, therefore, thought that the numerous advantages of my invention will be readily appreciated by those skilled in the art.

What I claim is:—

A pneumatic tire comprising an inner tube, and an outer tube adapted to surround the same, a strip of canvas overlying and co-extensive with the tread of such outer tube, and a series of overlapping, resilient armor plates superposed upon said canvas strip and permanently secured by means of rivets passing through the plates, strip, and outer tube, the rivets through each plate being arranged along one edge in a row transverse to the length of the tire, the other edge being free and arranged to overlap the riveted edge of the next plate, the free edge of each plate being bent or flared upwardly out of its own plane at its middle portion, to provide transverse ridges adapted to bite into the surface of the roadway.

In testimony whereof I affix my signature, in presence of two witnesses.

WALLACE W. TOMPKINS.

Witnesses:
CHESTER J. BROWN,
FLORENCE L. SMITH.